Patented Nov. 28, 1944

2,363,654

UNITED STATES PATENT OFFICE 2,363,654

RUBBER MOLDING COMPOSITIONS

Lawrence E. Daly, Osceola, Ind., assignor to United States Rubber Company, New York, N. Y., a corporation of New Jersey No Drawing. Application December 26, 1941, Serial No. 424,475

4 Claims. (Cl. 260—727)

This invention relates to improvements in rubber molding compositions, and more especially to rubber compositions having a high degree of stiffness, toughness and resiliency, due to combination with cyclicized rubber in which a major proportion of the natural protein, ash, and water-solubles originally present in the original India rubber have been eliminated.

More especially, the invention relates to the thermoplastic vulcanization product of the mix composed essentially of a vulcanizable rubber, a curing agent sufficient to cure the rubber to a soft or semi-hard rubber state, and a resinous rubber isomer obtainable by reacting on rubber with an acidifying isomerizing agent in the presence of a relatively large amount of a phenol. Such resinous rubber isomers are disclosed in the McKenzie U. S. Patent No. 2,230,359, and that produced by Example 1 of said patent is eminently suited for the production of the composition of the present invention.

The proportion by weight of the isomer based on the rubber of the composition may vary over a wide range to give, as desired, a more or less horny, tenacious product; a proportion of isomer in the range from 100% to 500%, and preferably between 200% and 300% based on the rubber, is used. The composition contains the usual vulcanizing assistants, such as accelerator, softeners, anti-oxidants, etc. Fillers such as whiting, wood flour, etc. may also be added, if desired, to an extent that does not materially affect the desired characteristics of the composition.

The composition before vulcanization may be compounded and handled on ordinary rubber manufacturing equipment. The composition is then subjected to a cure for 15 minutes or longer, at a curing temperature of from about 200° F. to about 300° F. During this cure a physicochemical change takes place that causes the material to become thermoplastic. At temperatures below those indicated in which the composition is merely hot and incompletely cured, the material shreds like an art-gum eraser, is weak, and cannot be drawn or molded into shape. The thermoplastic vulcanized product at room temperatures is a hard boardy material and has a number of interesting characteristics, among them being, that when heated up to approximately 220° F. to 350° F., the material is extremely thermoplastic and can then be molded very easily into all shapes and sizes; then when it is cooled down, it regains its original stiffness, toughness, and tenacity. Furthermore, it retains its toughness at low temperatures, for example at 40° F. below zero it is still resistant to shattering my impact; also it does not begin to soften until it reaches temperatures of about 200° F. and above. The hard boardy material is also highly resistant to the action of gasoline and other like fuels, softening and swelling to only a slight degree.

The tough, strong thermoplastic composition may be converted into any desired shape for the production of various fabricated articles, laminated or not, and may be used in the manufacture of various products, e. g., electrical insulation purposes, toe boxes, dishes, novelties and the like. For example, it may be calendered into sheets of the desired thickness and cut to the required size. Of great import is the fact that the vulcanized material can be rendered thermoplastic and while in this state shaped as desired to produce various articles, which on cooling, are exceptionally strong.

Vulcanized sheets so produced are flexible and of unusual strength and toughness. The vulcanized material may be softened by heating, placed in a mold, and shaped to any desired form, by molding, extruding, or otherwise, since the cured material when subsequently heated is very thermoplastic and adapts itself to any shape, regular or irregular.

A preferred and outstanding useful composition is composed of the following ingredients, by weight:

| | Parts |
|---|---|
| Pale crepe rubber | 30 |
| Hard resinous purified rubber isomer | 70 |
| Zinc oxide | 3 |
| Stearic acid | 1.5 |
| Agerite white (anti-oxidant) | 1 |
| Altax (accelerator) | 1 |
| Ethyl zimate (accelerator) | 0.2 |
| Sulfur | 3 |

The procedure of mixing, curing and heating is as follows:

The isomer is heated on a hot mill until it has become thermoplastic, and then the rubber is added slowly until it has become thoroughly mixed in. The stearic acid or other plasticizer is then added and mixed in. Thereafter, the anti-oxidant, accelerator and any desired fillers are thoroughly mixed in. This is followed by the sulfur, the mill roll temperature being lowered to about 125° F. before the sulfur is added. The whole procedure takes about 15 minutes. The material is then ready to be cured.

The curing may be done by any of the known processes of hot vulcanization, namely, by steam, air, or otherwise. The temperature of heating is at a temperature from about 200° F. to 300° F. for 15 minutes or more, i. e., sufficient to bring about a thermoplastic condition in the cured material during the cure. The material when cooled becomes hard, tenacious and horny-like.

In place of the natural rubber, such as the crude rubber shown above in the example, there may be used other caoutchouc rubbers, or artificially-prepared rubbers which are curable to similar degrees of durability and softness, with any desired curing agent, such as neoprene, Thiokol, Vistanex, Hycar, etc., or reclaims thereof. Materials like neoprene may be used to render the product more resistant to oils and solvents, such as gasoline, and the like.

Having thus described my invention, what I claim and desire to protect by Letters Patent is:

1. A hard boardy thermoplastic which is the conversion product of cure and heat at a temperature of from about 200° F. to about 300° F., of a mix composed essentially of a vulcanizable rubber, a curing agent sufficient to cure said rubber to a condition ranging from a soft vulcanized to semi-hard vulcanized state, and a hard highly purified resinous rubber isomer obtained from heating rubber in excess of a phenol in the presence of an acidifying isomerizing agent at a temperature above 125° C. but below the boiling point of the phenol, the proportion by weight of the isomer to the vulcanizable rubber ranging from about 200% to about 300%.

2. A hard boardy thermoplastic material which is the vulcanization product of a mix composed essentially of rubber, sulfur sufficient to cure the rubber to a condition ranging from a soft vulcanized to a semi-hard vulcanized state, and a resinous rubber isomer obtained from heating rubber in excess of a phenol in the presence of an acidifying isomerizing agent at a temperature above 125° C. but below the boiling point of the phenol, the proportion by weight of the isomer to the rubber ranging from 200% to 300%.

3. The thermoplastic vulcanization product of a mix composed essentially, by weight, of pale crepe rubber, approximately 30 parts; sulfur, approximately 3 parts; a resinous rubber isomer obtained from heating rubber in excess of a phenol in the presence of an acidifying isomerizing agent at a temperature above 125° C. but below the boiling point of the phenol, approximately 70 parts; and zinc oxide, approximately 3 parts.

4. An article composed at least in part of a vulcanization product as set forth in claim 1.

LAWRENCE E. DALY.